(12) United States Patent
Ferron

(10) Patent No.: US 7,484,456 B2
(45) Date of Patent: Feb. 3, 2009

(54) KITCHEN VESSEL HAVING A THERMOCHROMATIC SENSOR

(75) Inventor: Jacopo Ferron, Padova (IT)

(73) Assignee: Ballarini Paolo & Figli S.p.A., Montovano (IT)

(*) Notice: Subject to any disclaimer, the term of this patent is extended or adjusted under 35 U.S.C. 154(b) by 0 days.

(21) Appl. No.: 11/398,453

(22) Filed: Apr. 5, 2006

(65) Prior Publication Data

US 2006/0225502 A1   Oct. 12, 2006

(30) Foreign Application Priority Data

Apr. 6, 2005   (IT) ............... MI2005A0566

(51) Int. Cl.
*A47J 27/00* (2006.01)

(52) U.S. Cl. ............................... 99/342; 99/422

(58) Field of Classification Search ......... 99/342–344, 99/422–425, 403; 374/141–142, 179–180, 374/149, 157; 219/621; 73/322
See application file for complete search history.

(56) References Cited

U.S. PATENT DOCUMENTS

| | | | |
|---|---|---|---|
| 5,441,344 A * | 8/1995 | Cook, III | 374/141 |
| 5,482,373 A * | 1/1996 | Hutchinson | 374/141 |
| 5,934,181 A * | 8/1999 | Adamczewski | 99/342 |
| 6,544,614 B1* | 4/2003 | Huffer et al. | 428/40.1 |
| 6,578,469 B2* | 6/2003 | Sharpe | 99/342 |
| 6,620,764 B1* | 9/2003 | Maruyama | 503/227 |
| 6,860,192 B2* | 3/2005 | Sharpe | 99/342 |
| 6,942,383 B2* | 9/2005 | Kwon | 374/205 |
| 2002/0097777 A1* | 7/2002 | Ronci | 374/157 |
| 2005/0103209 A1* | 5/2005 | Ferron | 99/422 |
| 2006/0049176 A1* | 3/2006 | Ferron | 219/621 |

\* cited by examiner

*Primary Examiner*—Timothy F. Simone
(74) *Attorney, Agent, or Firm*—Kirschstein, et al.

(57) ABSTRACT

A kitchen vessel, having a thermochromatic sensor, comprises, in one or more outward extending lugs thereof, a thermal sensing device, such as an additional sensing element, made of a material holding thermochromatic pigments therein.

6 Claims, 2 Drawing Sheets

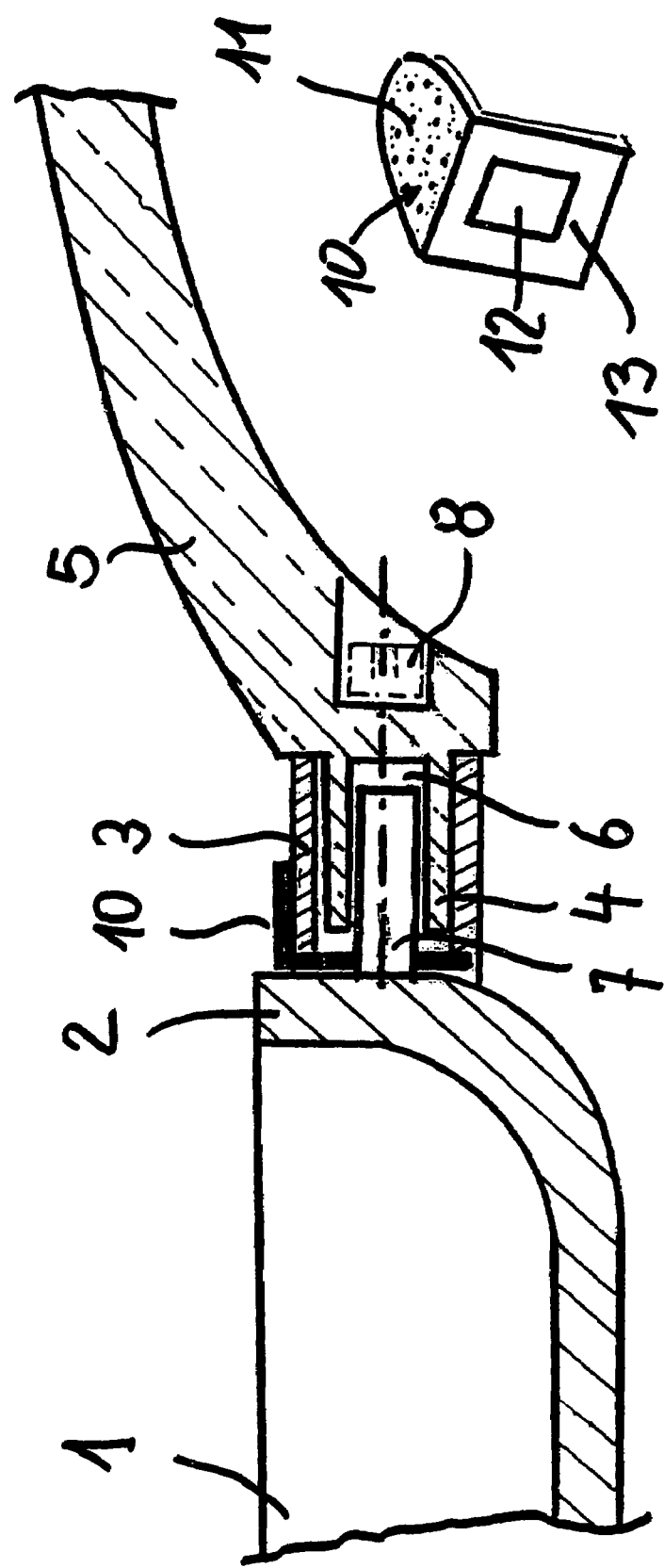

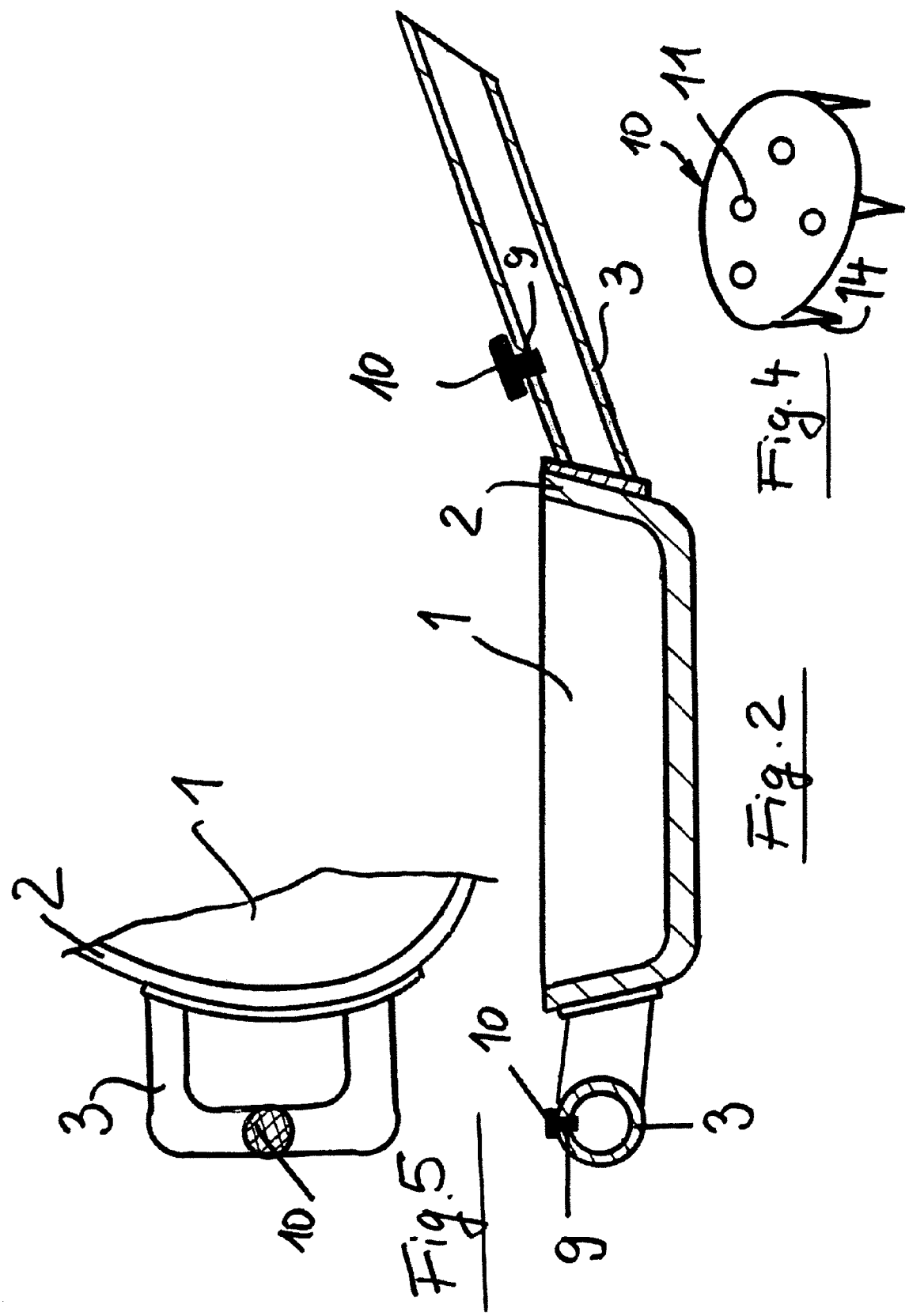

KITCHEN VESSEL HAVING A
THERMOCHROMATIC SENSOR

BACKGROUND OF THE INVENTION

The present invention relates to a kitchen vessel having a thermochromatic sensor.

The prior art already discloses to fully or partially paint or coat regions of a kitchen vessel, such as gripping lugs of a pan or pot, by thermochromatic paint materials which, at a set temperature, change their color, to signal a user that a set temperature has been achieved.

It is moreover known to paint or coat only given regions of a kitchen vessel by a thermochromatic pigment holding paint material, by applying, for example, rim or decorated portions, made of said thermochromatic paint material.

However, prior coating methods have the drawback that, in the painting or coating operation, which is generally an automatized painting operation, it is necessary to carry out particular coating steps by using a thermochromatic paint, which negatively affects the pan or pot automatized painting step.

Moreover, it is necessary to provide specifically designed tools, depending on the shape and size of the vessel, and on the vessel region to be coated by the thermochromatic particle containing materials.

Moreover, prior painting or coating methods have the further drawback that each thermochromatic paint is specifically designed for a specific and precise temperature range.

Yet another drawback of prior thermochromatic paint materials to be applied to or coated on a surface of a vessel or gripping lug, is that said paint materials are worn out in the time, upon cleaning and heating the vessel.

SUMMARY OF THE INVENTION

Accordingly, the aim of the present invention is to overcome the above mentioned drawbacks of the prior art, and provide a kitchen vessel, having a thermochromatic sensor, which does not require that gripping lugs be coated or painted, or to add to the vessel or pot coating paint material thermochromatic pigments, or print on the vessel paint layer, in a further decorating operation, marks, by using, to that end, a thermochromatic pigment holding paint material.

According to one aspect of the present invention, the above mentioned aim is achieved by a kitchen vessel, having a thermochromatic sensor, and being characterized in that one or more gripping lugs of the kitchen vessel have an additional element affixed thereto and forming a signaling or sensing body, holding thermochromatic pigments therein.

Thus, by this provision, the kitchen vessel can be painted or coated in an independent manner by conventional automatic coating systems and, depending on the use of the kitchen vessel, it is moreover possible to removably engage, in a suitable recess of the outer lugs, thermochromatic pigment holding means operating as sensors.

Thus, by the above mentioned provision, it is possible to make and assemble different types of sensors, containing different thermochromatic pigment materials, i.e. a fraying pan can be fitted with a signaling sensor calibrated on higher temperatures, whereas a pot provided, for example, for boiling food, can be provided with a signaling or detecting sensor including pigment materials changing their color at a lower temperature.

BRIEF DESCRIPTION OF THE DRAWINGS

The subject matter of the present invention will be disclosed in a more detailed manner and illustrated hereinafter with reference to two embodiments thereof, given only by way of an indicative example in the accompanying drawings, where:

FIG. 1 is a schematic cross-sectional view showing a kitchen vessel having a handle including a signaling or sensing device according to the present invention;

FIG. 2 is a further schematic cross-sectional view showing a vessel having a vessel handle and gripping arrangement according to a different embodiment;

FIG. 3 is a perspective view showing the sensing or signaling device in the form of an interexchangeable plate;

FIG. 4 is a further perspective view showing the signaling or sensing device in the form of an interexchangeable flat pad; and FIG. 5 shows a portion of a vessel having a vessel handle including a thermochromatic sensor.

DESCRIPTION OF THE PREFERRED EMBODIMENTS

As shown in FIG. 1, a pan or pot 1 (or other kitchen vessel) comprises a circumferential wall 2, therefrom a tubular lug 3 radially projects, said tubular lug 3 being made, for example, of a metal sheet material.

The tubular lug 3 comprises, in the embodiment shown in FIG. 1, an extension 4 projecting from the front side of a handle 5.

In this connection it should be apparent that the handle, made, for example, of a synthetic material, can also have any other desired configurations.

The front end portion 4 of the handle 5 comprises a hole 6 in which a threaded projecting element 7 rigid with the wall 2 of the vessel 1 is engaged.

Said handle 5 is locked at a desired position by using a locking screw 8, which is only schematically shown with its related screw head, whereas the screw stem is shown by a dashed line.

According to the present invention, into said threaded element or stud 7, a small plate operating as a sensor 10 holding thermochromatic pigments 11 therein is threaded.

Advantageously, the plate 13 comprises an assembling recess 12.

It is herein possible to choose thermochromatic pigments or dyes having a different thermal sensitivity and color.

Thus, for example, a thermochromatic sensor 10 can contain thermochromatic pigments 11 adapted to assume a programmed color, for example at a temperature of 50° C.

A further thermochromatic sensor 10 can also comprise thermochromatic pigments 11 adapted to assume a programmed color, for example at 75° C., and yet a further thermochromatic sensor 10 can comprise thermochromatic pigments 11 adapted to assume the programmed color for example at a temperature of 140° C.

Thus, it is possible to provide the kitchen vessel 1, at will, with the thermochromatic sensor 10 most suitable for the use provided for the kitchen vessel 1.

FIG. 2 shows an exemplary cross-sectional view of a different embodiment, in which the metal lugs 3 are clamped, for example by riveting, to the wall 2 of the vessel 1 and directly form the gripping lug (handle or gripping arrangement).

On said lugs a hole 9 for engaging therein the thermochromatic sensor 10, which, advantageously, has a shape of a cylindric pad, is provided.

In this case it would be advantageous to use a thermochromatic sensor changing its color at a temperature less than 55° C., thereby indicating a burning danger if the handle would be gripped by a user with unprotected hands.

The temperature of 55° C. is the maximum reference temperature for providing a safe gripping of metal parts without using protective means as provided by international Standards (for example EN12983-1).

FIG. 4 is a schematic perspective view showing a thermochromatic sensor 10 in the form of a pad comprising tooth elements 14 to be firmly engaged in a suitable recess.

Advantageously, the pad sensor 10 is also provided with tooth elements 12 operating as locating and anchoring members.

It should be easily apparent that it would also be possible to use different thermochromatic sensors 10 holding different sensitivity and/or color thermochromatic pigments, thereby providing a kitchen vessel 2 including, in its lugs, an interexchangebale thermochromatic sensor which, if damaged, can be easily and quickly replaced by a replacement tool.

The tongue-shaped thermochromatic body 10 shown in FIG. 1, is advantageously made of a metal material since, upon contacting a high temperature vessel, it would allow to detect, by the thermochromatic paint 11 color, the temperature of said vessel in a hot condition as it is heated, or in a cold condition, as it is cooled down.

The pad thermochromatic element 10 shown in FIG. 2 is advantageously made of a synthetic material, since it is easily compatible to the thermal condition of the component said element is engaged into, for a prioritary safety purpose, as above disclosed.

For this synthetic components, the chromatic arrangement can be made as follows:

the cold color starting will be the result of the synthetic material color and thermochromatic pigment color (for example basic yellow+thermochromatic blue=green or basic clear+thermochromatic green=green);

the hot end color, upon changing the color of the thermochromatic pigments, will be the result of two colors (for example a basic yellow+a clear thermochromatic pigment=yellow or a basic clear pigment+a red thermochromatic pigment=a red pigment).

This technique can be also advantageously applied for a conventional painting or coating of a metal component (for example the tongue 10 shown in FIG. 1).

It should be easily apparent that the above disclosed thermochromatic sensor can be applied in a simple manner to conventional kitchen vessels, without performing additional processing operations.

The invention claimed is:

1. A kitchen vessel, comprising:
a circumferential wall and a threaded element extending radially outwardly away from the circumferential wall;
a handle having a hollow extension into which the threaded element is received;
a hollow tubular lug extending between the circumferential wall and the handle, the lug circumferentially surrounding the extension; and
a thermal sensor mounted on the vessel between the circumferential wall and the handle, the sensor having a plate in thermal contact with the circumferential wall and having a recess through which the threaded element is received, and another plate bearing a thermochromatic material which changes color upon reaching a predetermined temperature.

2. The vessel of claim 1, wherein the recess has a rectangular configuration.

3. The vessel of claim 1, wherein the threaded element is externally threaded, and wherein the extension is internally threaded and threadedly engages the threaded element.

4. The vessel of claim 1, and a set screw for threadedly engaging the threaded element to securely connect the handle to the circumferential wall.

5. The vessel of claim 1, wherein one of the plates has a tongue shape.

6. The vessel of claim 1, wherein the thermochromatic material is selected from a group of pigments having different temperatures at which they change colors.

* * * * *